Feb. 3, 1959 M. E. LATTMANN 2,872,131
ROCKET
Filed Feb. 19, 1954 3 Sheets-Sheet 1
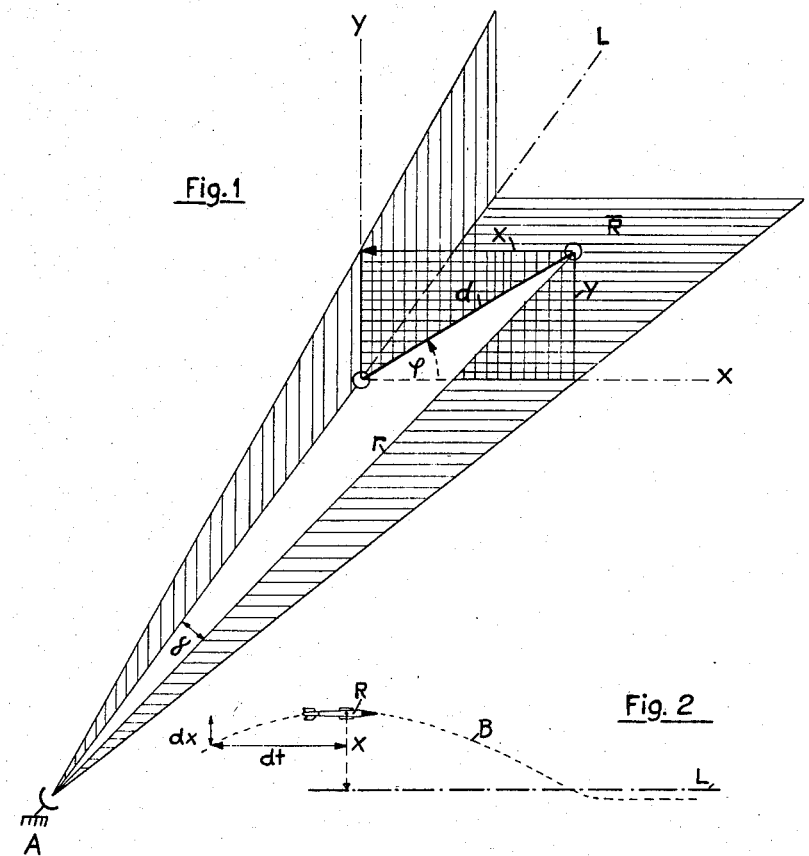
Fig. 1
Fig. 2
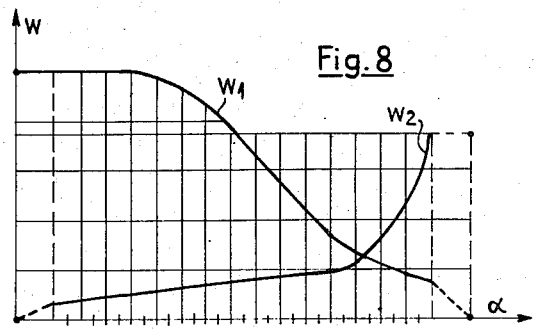
Fig. 8
INVENTOR:
Max E. Lattmann
BY
Richardy Geier
ATTORNEYS Feb. 3, 1959 M. E. LATTMANN 2,872,131
ROCKET
Filed Feb. 19, 1954 3 Sheets-Sheet 2
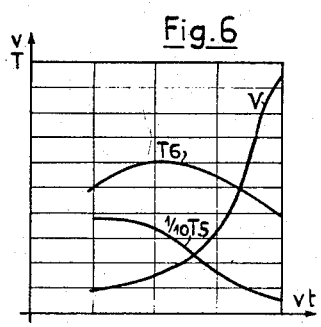
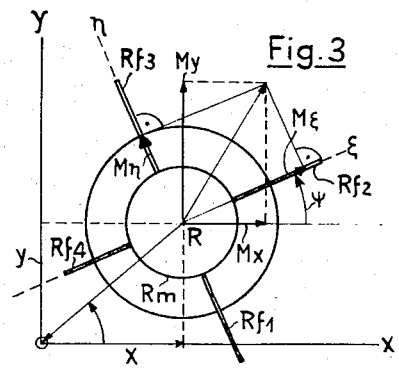
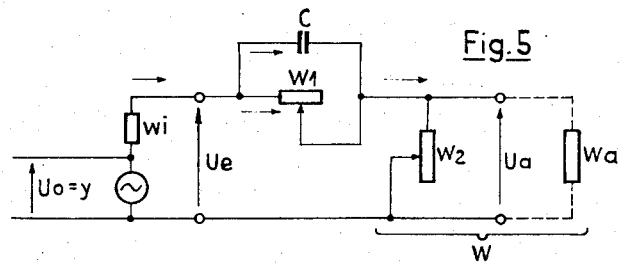
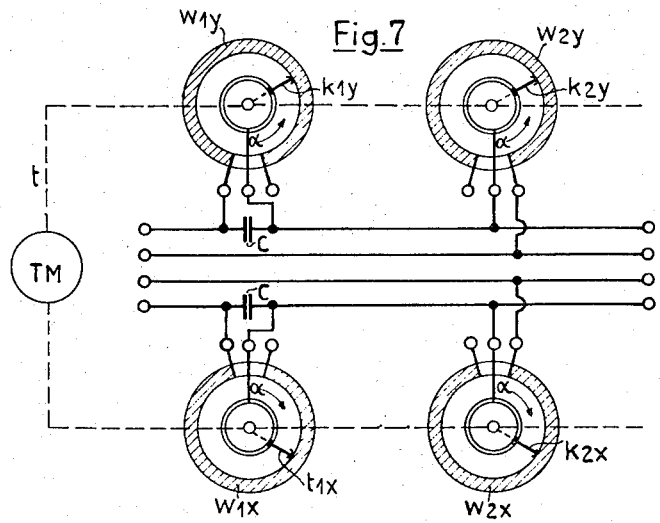
INVENTOR:
Max E. Lattmann
BY
ATTORNEYS

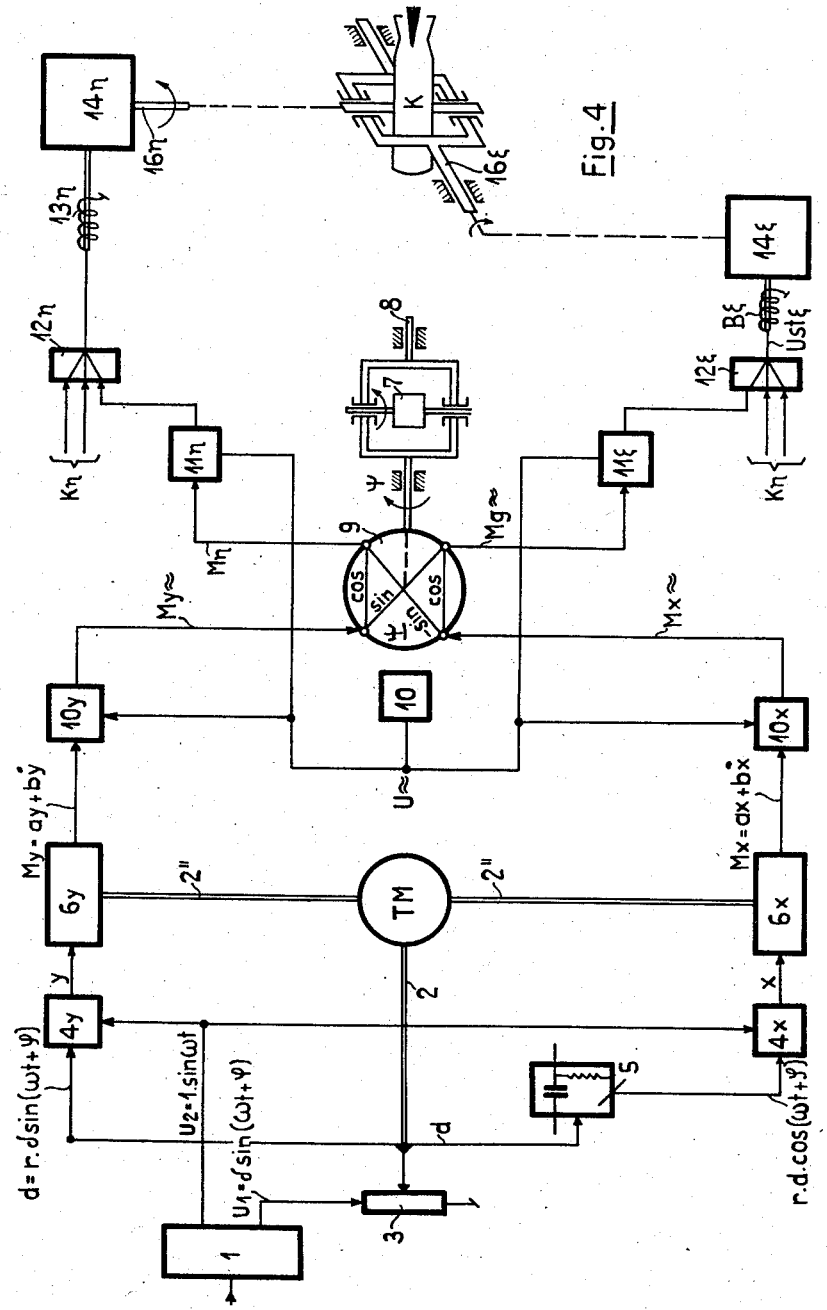

United States Patent Office 2,872,131
Patented Feb. 3, 1959

2,872,131

ROCKET

Max E. Lattmann, Zurich, Switzerland, assignor to Contraves AG, Zurich, Switzerland, a firm Application February 19, 1954, Serial No. 411,491

3 Claims. (Cl. 244—14)

This invention relates to a rocket guided by a high frequency guide ray and refers, more particularly, to an electrical signal transforming device for use on such rockets. A high frequency guide ray may be defined as a bundle of high frequency light rays projected into space to define a direction along which a rocket is guided.

Rockets of this type comprise receiving devices and transforming devices for high frequency ray signals which produce two electrical voltages $(x, y)$, the variable instantaneous values of which determine the variable instantaneous distance of the center of gravity of the rocket from the axis of the signal ray.

An object of the present invention is to improve devices of this type and to facilitate the guiding of a rocket by a high frequency signal ray.

Other objects of the present invention will become apparent in the course of the following specification.

The object of the present invention may be realized through the provision of differential devices for each of the two incoming voltages, the outgoing voltages as functions of the incoming voltages $x, y$ corresponding to the sums $ax+b\dot{x}$ and $ay+b\dot{y}$. The device also includes means varying impedance members of said differential devices in at least indirect dependence upon the immediate flight speed of the rocket in such manner that the values of the coefficients $a$ and $b$ will be substantially exactly predetermined functions of the flight speed of the rocket.

The invention will appear more clearly from the following detailed description when taken in connection with the accompanying drawings, showing by way of example a preferred embodiment of the inventive idea.

In the drawings:

Figure 1 is a diagram illustrating the geometric relationship between the center of gravity $\bar{R}$ of the rocket and the guide ray L.

Figure 2 is a diagram showing the curve of the flight B of a rocket R in relation to the guide ray L.

Figure 3 is a diagrammatic section through the rocket which rotates around its longitudinal axis, and at the same time illustrates the various steering values affecting the flight of the rocket.

Figure 4 is a diagram illustrating the various devices built into the rocket.

Figure 5 is a diagram illustrating a differential device of a rocket.

Figure 6 is a diagram showing the variations of the steering coefficients during a time period.

Figure 7 is a diagram illustrating in greater detail two differential devices of the type shown in Figure 5.

Figure 8 is a diagram showing the resistance characteristics of the rotary resistances $W_1$ and $W_2$ as a function of the position of the shaft.

The general principles used in guiding a rocket along a guide ray are as follows:

Figure 1 shows a sending device A which may be located on the earth, upon a ship, or upon an airplane, which is so constructed that it emits high frequency signals in the form of a guide ray L. By way of example, the ray L can be used to direct a flying rocket against an enemy airplane, so that the ray L must constantly change its direction in space. These changes in the direction of the ray L must be communicated to the rocket R shown diagrammatically in Figure 2. In Fig. 1 the center of gravity of the rocket is designated as $\bar{R}$. The present invention is concerned with means which continues to indicate to the flying rocket its relative position to the guide ray L.

As shown in Fig. 1, the relative distance between the rocket and the guide ray may be conveniently indicated by the coordinates $x$ and $y$ of a system of coordinates having the initial point O. This system of coordinates is defined by a plane XY extending through the rocket's center of gravity $\bar{R}$ vertically in space; this plane intersects at a right angle the vertical plane $y$L extending through the guide ray L. (It is apparent that the second reference plane $x$L consists of all horizontal straight lines passing through the guide ray axis L; these values are always applicable when the guide ray does not extend vertically).

In the rocket devices are provided which continuously measure the flight of the rocket from the center A and which supply the calculated deviation values $x$ and $y$ as signals to the rocket.

In the patent application, Serial No. 307,098 a device is described by means of which the rocket can be provided with a calculating device determining continuously in the form of electrical units the values $\delta$ (delta) and $\zeta$ (zeta), namely, the deviation angle $OA\bar{R}=\delta$ and the angle $\bar{R}OX=\zeta$, namely, the angle of inclination of the plane $AO\bar{R}$ extending through the ray axis L and the rocket's center of gravity $\bar{R}$ in relation to a reference plane AOX extending through the guide ray and the $x$ axis. When the value $r$, that is, the distance $A\bar{R}$ is known, the following equation will be substantially valid for the value $d=OR$:

$$d=r\times\delta \tag{1}$$

This equation is valid for all practical purposes, since the rocket will always stay close to the guide ray, so that $\delta$ has small values only.

From the values $d$ and $\zeta$ the following equations can be obtained:

$$d\times\cos\zeta=x \tag{2}$$
$$d\times\sin\zeta=y \tag{3}$$

Thus the coordinates $x$ and $y$ can be calculated.

In general, it can be assumed that the rocket is provided with devices receiving high frequency signals of the guide ray and transforming such signals; the purpose of these devices is to produce two electrical voltages, the variable amounts of which determine the existing shift of the center of gravity of the rocket from the axis of the guide ray according to the amount and direction. Such devices are described, for example, in the British Patent No. 724,031.

Furthermore, these two voltages which characterize the varying location of the rocket and which may be proportional to the coordinates $x$ and $y$ are to be utilized for the purpose of producing actuating forces $M_x$ and $M_y$; these values may be transformed into a system of coordinates based upon the rockets and affect a steering device which forms a part of the rocket and which can be adjusted in two directions of the coordinates in such manner that the rocket always has the tendency to approach the axis of the guide ray. The steering device may consist of a height adjusting, a side adjusting machine, ray actuated rudder device and the like. Figure 2 of the drawing illustrates the axis L of a guide ray and shows that in order to provide that the path B of the rocket R be a stable one, it is necessary to take into consideration and determine not only the immediate values $x$ and $y$ showing the relative position but their variations according to time $$\dot{x}=\frac{dx}{dt}$$

and $$\dot{y}=\frac{dy}{dt}$$

Practical experience has shown that a usable curve B of the flight path can be produced from the following steering values $M_x$ and $M_y$ $$M_x=+ax+b\dot{x}+K_x \qquad (4)$$

$$M_y=+ay+b\dot{y}+K_y \qquad (5)$$

In the Equations 4 and 5 $M_x$ and $M_y$ are the steering values in an X—Y system, while $x$, $y$ represent the amounts of the measuring voltages.

$$\dot{x}=\frac{dx}{dt}$$

and $$\dot{y}=\frac{dy}{dt}$$

represent deviations according to time; $a$ and $b$ are coefficients.

The values $K_x$ and $K_y$ are additional correctional amounts which can be larger or smaller according to conditions of stability and which for the present can be disregarded, since they do not affect the main principles involved.

Rockets actuated from a distance are usually so constructed that in the course of the flight they rotate about their own longitudinal axis. In this case it is necessary to transform the steering values $M_x$ and $M_y$ which are effective in the X—Y—L system, that is, in a coordinate system defined in space, corresponding to the rotation of the rocket into a system of coordinates based upon the rocket, so that the steering device or the steering devices carried by the rocket can shift it in the correct direction.

Figure 3 illustrates diagrammatically a transverse section through the rocket R. The rocket R is provided with an outer cover $Rm$ and carries four stabilizing ailerons $Rf_1$, $Rf_2$, $Rf_3$ and $Rf_4$. The center of gravity $\bar{R}$ of the rocket R has a position relatively to the guide ray L which is determined by coordinates $x$ and $y$. According to the Equations 4 and 5, steering forces $M_x$ and $M_y$ are produced which are also illustrated in Fig. 3.

It should be noted, however, that the rocket is shifted in relation to the system of coordinates X—Y to the extent of an angle $\psi$ (psi) and, therefore, the following equations determine the steering values $M\xi$ and $M\eta$ which have been transformed into a system of coordinates $\xi$ (xi), $\eta$ (eta), which is based on the rocket $$M\xi=M_x \cos \psi + M_y \sin \psi \qquad (6)$$

$$M\eta=-M_x \sin \psi + M_y \cos \psi \qquad (7)$$

Consequently, the rocket must be provided with means which continually determine the angle $\psi$ that is, the angle to the extent of which the rocket has been rotated relatively to the X direction which is defined in space. Preferably, these means include a cardanically suspended gyro which serves to determine the prevailing position.

If, for example, at the time the rocket begins its flight the axis of rotation of this gyro has been set in a predetermined direction and if the gyro is so located that the aileron $Rf_1$ extends perpendicularly downwardly, while the aileron $Rf_2$ extends horizontally to the right, then the rotation of the outer cardanically suspended frame about an axis parallel to the axis of the rocket can be transmitted continuously in the form of a rotary angle $\psi$ upon a transformation device which receives voltages corresponding to the values $M_x$ and $M_y$ and which produces two outgoing voltages corresponding to the values $M\xi$ and $M\eta$ according to the Equations 6 and 7.

These electrical steering values $M\xi$ and $M\eta$ which are referred to the system of coordinates $\xi$, $\eta$, of the rocket can be transformed individually into mechanical operating forces $P\xi$ and $P\eta$; these forces will actuate a steering mechanism in the directions of the coordinates $\xi$ and $\eta$ which belong to the rocket.

Figure 4 illustrates diagrammatically the devices present in a rocket and necessary to carry out into practice the above described mathematical relationships.

Figure 4 shows a high frequency receiver 1 which contains the organs receiving and transforming high frequency energy of the guide ray. The receiver 1 is described in greater detail in the copending patent application Serial No. 307,098, filed August 29, 1952.

The high frequency receiver 1 is so constructed that it produces two alternating voltages which are synchronous but shifted in space.

$$U_1=\delta \sin (\omega t+\zeta) \qquad (8)$$

$$U_2=1 \times \sin \omega t \qquad (9)$$

These voltages are to be used to determine the values $x$ and $y$. As is apparent from the Equation 1 the distance $r=A-\bar{R}$ must be known to determine the values $d=\delta \times r$. However, since the distance is approximately a definite function of the time of the flight $[r=f(t)]$, it is necessary to provide within the rocket a timing device TM, for example a clock-work motor, which is connected with a shaft 2 and which actuates a voltage divider 3 connected with the shaft 2. The voltage divider 3 receives from the receiver 1 the voltage $U_1=\delta \sin (\omega t+\zeta)$ and is so actuated that its outgoing voltage corresponds substantially precisely to the voltage $d=r \times \sin (\omega t+\zeta)$. This voltage is transmitted to a so-called discriminator $4_y$ which also receives the second voltage $U_2=1 \times \sin \omega t$. From these two voltages in the usual way a voltage y is produced which according to the Equation 3 has the value $d \times \sin \zeta$.

The mechanism includes a phase shifting device 5 which is used in order to shift the voltage $d \times \sin (\omega t+\zeta)$ to the extent of 90° so that the voltage $r \times \cos (\omega t+\zeta)$ is produced which is transmitted to a so-called discriminator $4_x$. The device $4_x$ produces in relation to the voltage $1 \times \sin \omega t$, a voltage having the value $x$ which according to the Equation 2 has the value $d \times \cos \zeta$.

As already stated, the voltages $x$ and $y$ vary in time and they are supplied through a differentiator $6_x$ and $6_y$. The purpose of these devices is to produce voltages according to the Equations 4 and 5 which have the values $ax+b\dot{x}$ and $ay+b\dot{y}$. Since the coefficients $a$ and $b$ must depend from the prevailing speed of the rocket, that is, from the aerodynamic stability of the rocket, and since the speed of the rocket is a function of the flight time $t$, the organs of the differentiators $6_x$ and $6_y$ are influenced by the time motor TM by means of the shaft $2'$ and $2''$. These differentiators will be described in greater detail hereinafter.

The voltages $M_x$ and $M_y$ at the outward side of the differentiators $6_x$ and $6_y$ are direct voltages which vary in time and which must be transformed into the values $M\xi$ and $M\eta$ according to the Equations 6 and 7.

A gyro 7 serving as a location reminder is cardanically suspended in the rocket in such manner that its outer frame is rotatably mounted upon a shaft 8 which extends parallel to the axis of the rocket. In the course of the rotation of the rocket this shaft is rotated about a defined angle $\psi$; the shaft 8 is rigidly coupled with the driving shaft of a transforming device (eight pole-transformer) used to transform incoming voltages having the values $M_x \approx$ and $M_y \approx$ as functions of the angle of rotation of the cardan shaft 8 into the values $$M\eta \approx = M_y \approx \cdot \cos - M_x \approx \cdot \sin \psi$$

and $$M\xi \approx = M_y \approx \cdot \sin + M_x \approx \cdot \cos \psi$$

The symbol $\approx$ is used herein to designate alternating current values, since the capacitive eight pole transformer 9 can work only on alternating current. The devices 9 are described in greater detail in the copending patent application, Ser. No. 440,188. They may consist of condensers used for transforming high frequency alternating voltages. For that purpose, the rocket contains an oscillator 10 which produces an alternating voltage $U\approx$ of approximately 500 hertz (frequency units) which is supplied to two modulators $10_x$ and $10_y$; these devices also receive the voltages $M_x$ and $M_y$. They produce alternating voltages $M_x\approx$ and $M_y\approx$ having the oscillator frequency and the amplitudes $M_x$ and $M_y$; they are transformed by the device 9 into alternating voltages $M\xi\approx$ and $M\eta\approx$ of the same frequency and of the amplitudes $M\xi$ and $M\eta$.

The modulators $11\xi$ and $11\eta$ which receive these voltages $M\xi\approx$ and $M\eta\approx$ as well as the oscillator voltage $U\approx$ are used to produce variable direct voltages $M\xi$ and $M\eta$. By means of addition devices $12\xi$ and $12\eta$ further correctional voltages can be added to these steering voltages, so that actual operating voltages $U_{st}\xi$ and $U_{st}\eta$ are produced.

Electro-mechanical transforming devices $13\xi$ and $13\eta$ transform the steering voltages into shifting movements of pins or the like, which actuate a mechanical amplifier $14\xi$ or $14\eta$. A cardanically suspended focal chamber K can be used as the operating organ and may be provided with shifting shafts $16\xi$ and $16\eta$ which represent the outgoing forces of the mechanical amplifier 14. A relative turning of the shaft $16\xi$ by the force $14\xi$ produces a shifting of the rocket in its $\xi$ direction, while a relative turning of the shaft $16\eta$ by the force $P\eta$ produces a shifting of the rocket in its $\eta$ direction.

It is apparent that suitable means may be provided to shift the aerodynamic steering ailerons for the purpose of steering the rocket.

It is apparent from the above that the described device provides means for changing the coordinates $x$ and $y$ which represent the deviation of the rocket into forces $P\xi$ and $P\eta$ so as to actuate a steering device of the rocket into directions of coordinates which belong to the rocket, whereby the rocket will also tend to approach the axis of the guide ray L, as illustrated in Fig. 2.

Figure 5 illustrates diagrammatically a differential device 6.

The voltage to be differentiated, such as the voltage $y$, produced by the discriminator $4_y$ shown in Fig. 4, has the value $U_0$ and the inner resistance of the source, namely, at the discriminator, has the value $W_1$. Then the contact voltage $U_0$ at the incoming side of the differentiator is located at a resistance composed of the resistance composed of the resistances $W_1$ and $W_2$ which are interconnected in series. The resistance $W_1$ is connected in parallel with a capacity C. The outgoing voltage $U_a$ is obtained at the resistance $W_2$, which is connected in parallel with the receiving resistance $W_a$ of the following element which is the modulator 10, so that the following value is obtained:

$$W_x^* = \frac{W_2 . W_a}{W_2 + W_a}$$

The following relationship exists between the voltage $U_0$ and the voltage $U_a$:

$$T_6 \frac{dU_a}{dt} + U_a = v^* \left( T_5 \frac{dU_0}{dt} + U_0 \right) \quad (10)$$

The following definitions are in effect:

$$T_6 = \frac{W_i + W^*}{W_1 + W_i + W^*} \cdot C . W_1 \quad (11)$$

$$T_5 = C . W_1 \quad (12)$$

$$v^* = \frac{W^*}{W_1 + W_i + W^*} \quad (13)$$

If the Equations 4 and 5 are compared with the Equation 10 then it is apparent that the coefficient $a$ in the Equations 9 and 5 may be replaced by the coefficient $v^*$ while the coefficient $b$ in the Equations 4 and 5 can be replaced by the product $v^* \times T_5$. These coefficients depend to a great extent upon the aerodynamic stability of the rocket. In air of normal density this stability depends upon the speed of the rocket and increases with an increase in the speed.

The speed of the rocket and, consequently, its aerodynamic stability are comparatively small at the beginning of the flight. The value $v^*$ of the Equations 10 and 13 must be also correspondingly small, since these values have the greatest effect upon the operating force corresponding to a certain deviation in the location of the rocket. Then, when the values of $v^*$ are comparatively great and when the speed of flight of the rocket is small, the longitudinal axis of the rocket would be swung too bruskly in relation to the prevailing direction of the flight and the flight would then become unstable.

Toward the end of the flight the value $v^*$ must be large so as to overcome the moment of inertia based on the aerodynamic stability which is large in relation to the produced steering forces, so as to enable the rocket to be deviated comparatively quickly despite its high speed. The steering coefficient $T_6$ in the Equations 10 and 11 is obtained directly from the device of Figure 5. The unavoidable constant representing the so-called smoothing time must be as small as possible, particularly when the rocket is flying at high speed.

The diagram of Figure 6 shows an advantageous provision of three steering coefficients $T_6$, $T_5$, and $v^*$ represented as functions of the flight speed $v$ of a rocket which does not fly higher than about 50 km. If the flight speed is a linear function of time $t$, which is often the case, then these curves represent the values of said steering coefficients as functions of the flight time $t$.

These requirements for the steering coefficients can be realized by constructing the differentiators $6_x$ and $6_y$ in the manner illustrated in Figure 7. The time motor TM, which is also shown in Fig. 4, has a shaft $t$ which is firmly connected with rotary contacts $k_{1x}$, $k_{2x}$, $k_{1y}$ and $k_{2y}$ of the four rotary resistances $W_{1x}$, $W_{2x}$, $W_{1y}$ and $W_{2y}$. These rotary resistances represent the resistances $W_1$ and $W_2$ of Figure 5. During the flight of the rocket the shaft $t$ is rotated with constant speed. The resistance characteristics of the potentiometers as a function of the position of the rotary shaft are adapted to the known relationship between the speed time $t$ and speed $v$ in such manner that the curves of the steering coefficients $T_6$, $T_5$ and $v^*$ are those illustrated in Fig. 6. These resistance characteristics are indicated by way of example in the curves shown in Fig. 8.

It is apparent that the rotary driving shaft for the four rotary contacts of the four variable resistances of the two differential organs which are constructed as rotary resistances, can be also driven depending upon the flight speed in such manner that the immediate rotary position is a definite function of the flight speed, whereby the resistance characteristics of the four rotary resistances can correspond to predetermined values, depending upon the rotary positions of their contacts $k$ in such manner that there will be a predetermined relationship between the immediate values of the coefficients $a$ and $b$ and the immediate flight speed.

On the other hand, it is possible to vary the impedance members of the above described differential devices in at least an indirect dependence upon the prevailing aerodynamic stability of the rocket in such manner that the values of the coefficients $a$ and $b$ represent substantially precisely predetermined functions of this momentary prevailing aerodynamic stability.

Furthermore, the rocket can be provided with means for measuring continuously the Mach number and said means may have a shaft serving as the driving element for the impedance members of the differential organs which are constructed as variable rotary resistances.

These and other variations and modifications are to be included within the scope of the present invention.

What is claimed is:

1. In a rocket guided by a high frequency signal ray, an electrical transforming device comprising means receiving the high frequency signals and transforming them into two electrical currents having variable voltages, a separate differentiation device for each of said voltages, each of said differentiation devices comprising two resistances interconnected in series and a capacity connected in parallel with one of said resistances, a setting device varying said resistances at least indirectly depending upon the flight speed of the rocket, and means transforming the voltages produced by said differentiation devices into alternating voltages of a predetermined frequency and variable amplitudes proportional to the distance of the center of gravity of the rocket from the axis of the ray measured in a rectangular system of coordinates $(x, y)$.

2. In a rocket guided by a high frequency signal ray, an electrical transforming device comprising means receiving the high frequency signals and transforming them into two electrical currents having variable voltages, a separate differentiation device for each of said voltages, said differentiation devices comprising four variable rotary resistances and rotary contacts for said resistances, a rotary driving shaft for said contacts, and means connected with said shaft for driving the same so that its positions in the course of the rotation are a definite function of the flight speed of the rocket, such differentiation devices producing voltages corresponding to the sums $(ax+b\dot{x})$ and $(ay+b\dot{y})$ respectively, whereby the values $(x, y)$ correspond to the extent and direction of the deviation of the center of gravity of the rocket from the axis of the ray, the resistance characteristics of said resistances being so selected that depending upon the positions of the rotating contacts there is a predetermined relationship between the values of the coefficients $(a, b)$ and the corresponding flight speed of the rocket.

3. In a rocket guided by a high frequency signal ray and adapted to fly with a speed which is a know function of the flight time, an electrical transforming device comprising means receiving the high frequency signals and transforming them into two electrical currents having variable voltages, a separate differentiation device for each of said voltages, said differentiation devices comprising four variable rotary resistances and rotary contacts for said resistances, a time shaft, a motor, a gear drive connecting said motor with said shaft for driving said shaft with uniform speed during the flight, said shaft being connected with said contacts, said differentiation devices producing voltages, corresponding to the sums $(ax+b\dot{x})$ and $(ay+b\dot{y})$ respectively, whereby the values $(x, y)$ correspond to the extent and direction of the deviation of the center of gravity of the rocket from the axis of the ray, the resistance characteristics of said resistances being so selected that depending upon the positions of the rotating shaft there is a predetermined relationship between the values of the coefficients $(a, b)$ and the corresponding flight speed of the rocket.

References Cited in the file of this patent

UNITED STATES PATENTS

| | | |
|---|---|---|
| 2,548,278 | Wirkler | Apr. 10, 1951 |
| 2,557,401 | Agins | June 19, 1951 |
| 2,616,640 | Bedford | Nov. 4, 1952 |